United States Patent
Golownia, Jr. et al.

(10) Patent No.: US 7,183,935 B2
(45) Date of Patent: Feb. 27, 2007

(54) METHOD AND APPARATUS FOR DETERMINING MOTOR VELOCITY USING EDGE MODE HYSTERESIS WITH A FINITE IMPULSE RESPONSE AVERAGE FILTER

(75) Inventors: John Joseph Golownia, Jr., Milwaukee, WI (US); Thomas J. Rehm, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 214 days.

(21) Appl. No.: 10/965,527

(22) Filed: Oct. 14, 2004

(65) Prior Publication Data
US 2006/0082460 A1   Apr. 20, 2006

(51) Int. Cl.
*G08B 21/00* (2006.01)

(52) U.S. Cl. ............ 340/648; 318/68; 318/268

(58) Field of Classification Search ........... 340/441, 340/686.3, 679, 670, 671, 672, 648, 619; 318/268, 800, 811, 6, 68; 324/177, 170, 324/166, 76.69
See application file for complete search history.

(56) References Cited

U.S. PATENT DOCUMENTS

| | | | | |
|---|---|---|---|---|
| 5,225,749 A | * | 7/1993 | Watanabe | ............ 318/268 |
| 5,367,241 A | * | 11/1994 | Lee et al. | ............ 318/799 |
| 5,654,836 A | * | 8/1997 | Oh | ............ 360/70 |
| 5,773,938 A | * | 6/1998 | Seong et al. | ............ 318/6 |
| 6,381,400 B1 | * | 4/2002 | Kwon et al. | ............ 386/80 |
| 6,418,274 B2 | * | 7/2002 | Tanaka | ............ 388/800 |
| 6,541,939 B2 | * | 4/2003 | Kishibe et al. | ............ 318/799 |
| 6,658,335 B2 | * | 12/2003 | Kleinau | ............ 701/41 |
| 2002/0180388 A1 | * | 12/2002 | Fletcher | ............ 318/254 |
| 2004/0174126 A1 | * | 9/2004 | Chapman et al. | ............ 318/268 |

* cited by examiner

*Primary Examiner*—Brent A. Swarthout
(74) *Attorney, Agent, or Firm*—Quarles & Brady LLP; William R. Walburn

(57) ABSTRACT

A method for determining motor velocity includes generating an edge signal including a plurality of edges. The edge signal indicates rotational travel of a motor. Edge counts in the edge signal occurring during periodic sample intervals are determined. The edge counts are filtered over a predetermined number of samples. A velocity feedback signal is generated for the motor based on the filtered edge counts. A drive unit for controlling a motor includes an edge detection unit, a position accumulator, and a velocity filter. The edge detection unit is operable to receive a motor position signal and generate an edge signal including a plurality of edges. The edge signal indicates rotational travel of the motor. A position accumulator is operable to determine edge counts in the edge signal occurring during periodic sample intervals. The velocity filter is operable to filter the edge counts over a predetermined number of samples to generate a velocity feedback signal for the motor based on the filtered edge counts.

27 Claims, 5 Drawing Sheets

METHOD AND APPARATUS FOR DETERMINING MOTOR VELOCITY USING EDGE MODE HYSTERESIS WITH A FINITE IMPULSE RESPONSE AVERAGE FILTER

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to motion control systems, and, more particularly, to a method and apparatus for determining motor velocity using edge mode hysteresis with a finite impulse response filter.

Rotating motors are typically controlled by a motor drive that receives a desired motor velocity signal and, based on the motor velocity signal, produces and outputs a torque signal that is applied to the motor. Adjustment of the torque signal based on changes to the desired motor velocity signal relative to the actual motor velocity ensures that the motor rotates at the desired velocity.

Conventional drive systems include an optical motor encoder that detects and counts the passage of optical markings present on a disk that rotates along with the rotating load during operation. The output from the encoder can be analyzed to determine motor position and velocity. Typical encoders employ a two channel system that outputs pulse trains corresponding to detections of the optical markings. Phase differences between the pulse trains from each channel may be used to determine motor direction. An edge detection circuit receives both pulse trains and generates a edge signal which includes a peak for every rising and falling edge of the pulse train for each channel. Hence, four successive peaks would represent a rising edge of the A channel, a rising edge of the B channel, a falling edge of the A channel, and a falling edge of the B channel.

An accumulator circuit receives the edge signal and tracks the position of the motor using a counter that is incremented for each edge while the motor is moving in one direction and decremented for each edge while the motor is moved in the opposite direction. The counter is periodically sampled to calculate a velocity measurement for the motor, which is fed back to the motor drive to adjust the torque signal applied to the motor to thereby control the velocity of the motor.

FIG. 1 illustrates an exemplary edge signal 10 useful for determining motor position and velocity. The edge signal includes a plurality of edges 12 representing rising and falling edges of the signal generated by the encoder. The accumulator is sampled at the frequency indicated by sampling interval 14. The edge-to-edge time (i.e., the time between four edges or the time between subsequent rising edges of the A channel signal) is represented by the edge-to-edge interval 16. Note that the accumulator is sampled in the time period between edges. An edge timer, which is reset with the receipt of every edge, may be used to track the time elapsed since the last edge so that the edge signal may be aligned to the last edge for accurate velocity determination. Thus, the counter and edge timer may be sampled concurrently to accurately determine the number of edges that occurred during the current sampling interval as well as the precise time at which the edges occurred.

The edge detection velocity technique is effective at higher motor velocities in which several encoder edges occur during each sampling interval. For slower velocities, the edge technique introduces excessive phase shift, and at some point, the time of the last encoder edge can no longer be measured. The edge timer may overflow between edges, thereby reducing the accuracy of the last edge time. Hence, the edge-to-edge time method is disabled and a fixed sample interval (dx/dt) velocity calculation is employed, where the number of pulses between sampling intervals is divided by the sample interval to calculate the velocity. Typically, a hysteresis technique is used where the edge-to-edge technique is disabled when the calculated velocity drops to zero (e.g., no edges detected during a sampling interval). The dx/dt technique is employed until the edge count exceeds a predetermined threshold (e.g., four edges per sampling interval).

FIG. 2 illustrates a curve generated for a dx/dt time technique, where the motor velocity is determined by dividing the number of edges counted during a sampling interval by the sampling interval. For purposes of illustration, the motor velocity is kept below a point at which an edge-to-edge algorithm would be enacted (e.g., four edges per sampling interval). In the example of FIG. 2, the motor velocity is varied sinusoidally between +35 rpm and −35 rpm at a frequency of 1 second. The sample interval for the velocity algorithm is 500 usec.

FIG. 2 shows plot of a velocity feedback signal 20 from the dx/dt velocity calculation algorithm and a baseline signal 22 generated from the feedback signal 20. The baseline signal 22 represents the actual velocity of the motor 32. The phase shift between the feedback signal 20 and the baseline signal 22 results from the low pass filtering technique employed to generate the exemplary curve for illustrating the baseline signal 22.

Employing the dx/dt technique illustrated in FIG. 2, results in a feedback velocity signal with significant jitter. The determined velocity falls within a discrete velocity band depending on the number of edges that occurred during a sampling interval. The discrete bands in the velocity feedback signal 20 indicate where 1, 2, or 3 edges are detected per sampling interval.

High performance drives encounter a 'noise limit' in the velocity feedback determination that restricts the maximum achievable bandwidth. This problem becomes worse as sample times are reduced (e.g., below one millisecond).

Therefore, there is a need for a technique to measure motor velocity at times of low velocity operation that reduces the level of jitter in the feedback signal. The present invention is directed to overcoming, or at least reducing the effects of, one or more of the problems set forth above.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

BRIEF SUMMARY OF THE INVENTION

The present inventors have recognized that a technique for generating a velocity feedback signal using a finite impulse response filter may be employed to reduce jitter in the feedback signal at all motor velocities.

One aspect of the present invention is seen in a method for determining motor velocity includes generating an edge signal including a plurality of edges. The edge signal indicates rotational travel of a motor. Edge counts in the edge signal occurring during periodic sample intervals are determined. The edge counts are filtered over a predetermined number of samples. A velocity feedback signal is generated for the motor based on the filtered edge counts.

Another aspect of the present invention is seen in a drive unit for controlling a motor. The drive unit includes an edge detection unit, a position accumulator, and a velocity filter. The edge detection unit is operable to receive a motor position signal and generate an edge signal including a plurality of edges. The edge signal indicates rotational travel of the motor. A position accumulator is operable to determine edge counts in the edge signal occurring during periodic sample intervals. The velocity filter is operable to filter the edge counts over a predetermined number of samples to generate a velocity feedback signal for the motor based on the filtered edge counts.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
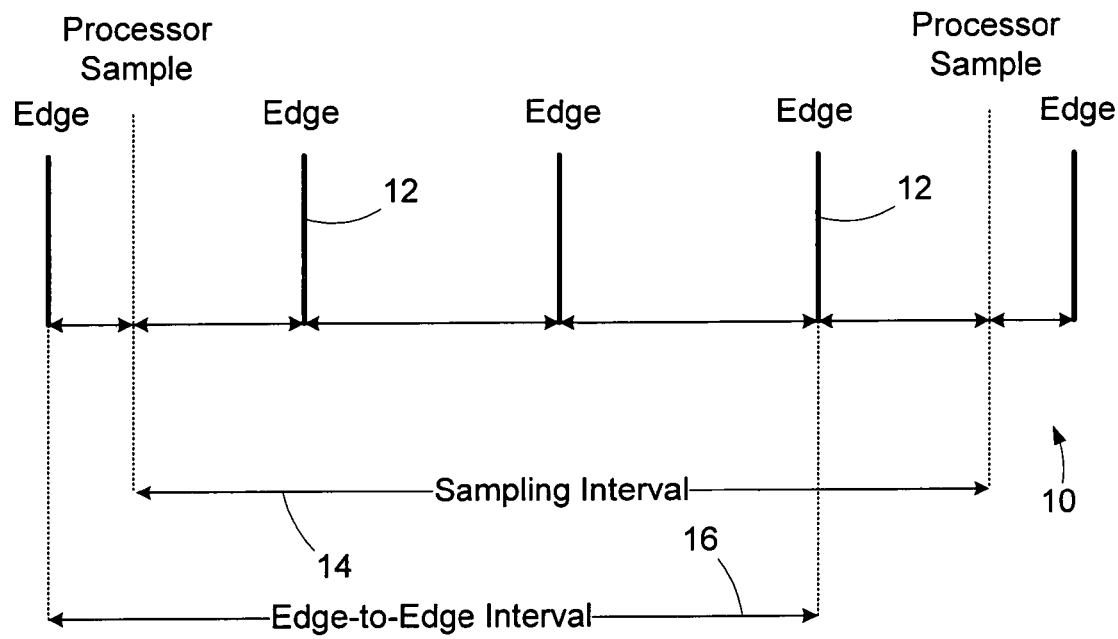
FIG. 1 is diagram illustrating an edge signal generated from an encoder output useful for determining motor position and velocity.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 3:
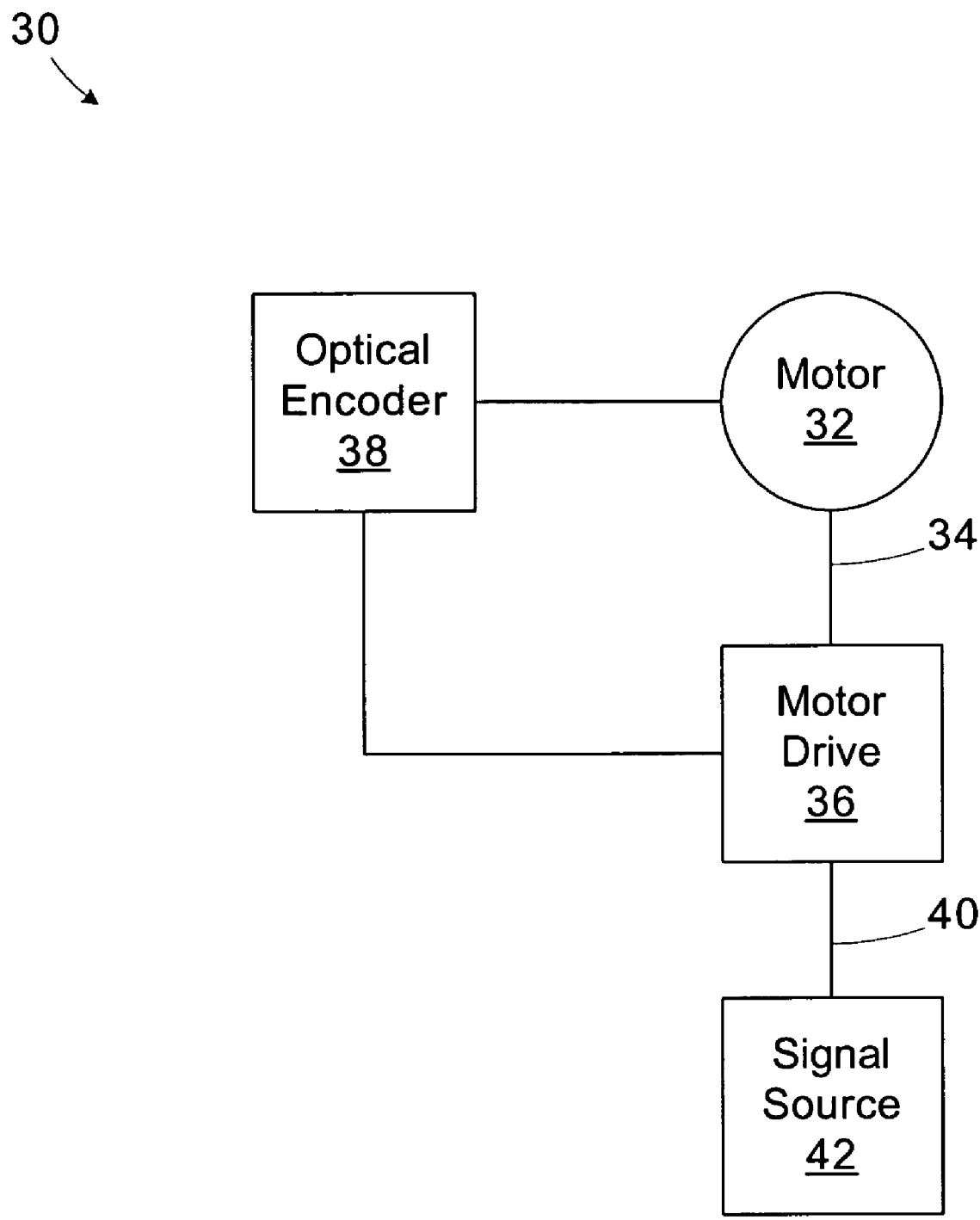
FIG. 3 is a simplified block diagram of a motor control system in accordance with one embodiment of the present invention.

Referring now to the drawings wherein like reference numbers correspond to similar components throughout the several views and, specifically, referring to FIG. 3, the present invention shall be described in the context of a motor control system 30. The motor control system 30 includes a conventional motor 32 having a rotatable load (not shown). In the illustrated embodiment, the motor 32 is of the type that receives a torque input signal 34 from a motor drive 36 and rotates the load at a desired velocity in response to the torque input signal 34. A plurality of radially displaced optical markings (not shown) is disposed about the periphery of a disk that rotates with the load. An optical encoder 38 includes a scanner that identifies the passage of each marking to enable the determination of the load position, as will be described in more detail below. The motor drive 36 receives a command velocity signal 40 from a signal source 42, and converts the command velocity signal 40 into torque signals that are recognized by motor 32. The torque signals are adjusted during operation based on 1) a deviation between the actual load position and desired load position, and 2) motor inertia that prevents the motor 32 from immediately reacting fully to a change in the torque input signal 34.

The signal source 42 may comprise any conventional device capable of receiving an input related to a desired velocity of motor rotation. The input may either be manually entered (e.g., via a man machine interface) or can be automatically provided to the signal source 42 via an automated control system.

Figure 4:
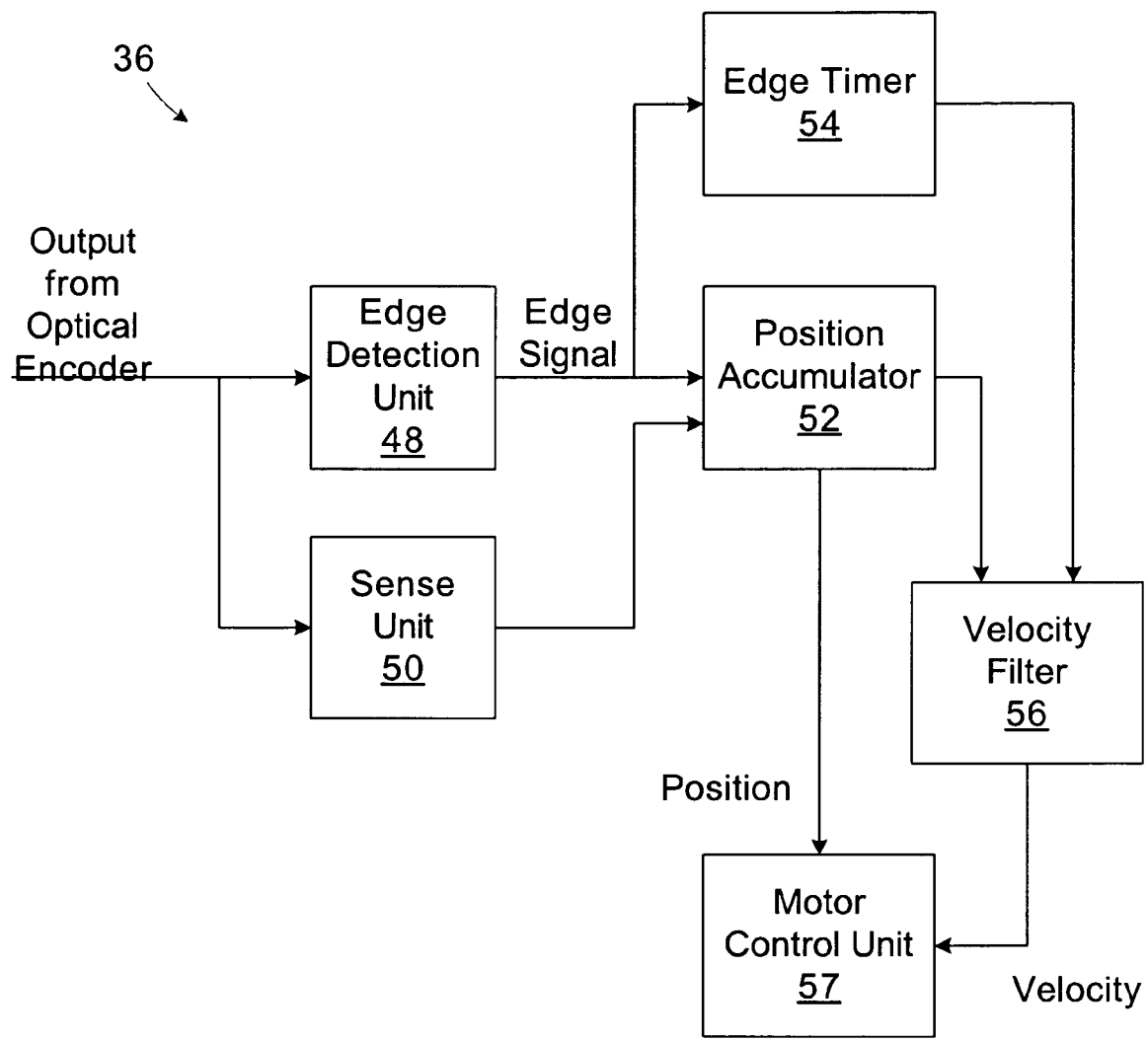
FIG. 4 is a simplified block diagram of a motor drive in the motor control system of FIG. 3.

The motor drive 36 receives the output of the optical encoder 38 to track and control the velocity and position of the motor 32. The operation of the motor drive 36 for controlling velocity is described in greater detail below in reference to FIG. 4. The components of the motor drive 36 are programmed in firmware. Entities described as units may be implemented in the firmware as a set of instructions that, when executed, perform the described function. The motor drive 36 includes an edge detection unit 48 that receives the output signal (e.g., dual channel pulse signals) from the optical encoder 38 and generates an edge signal, similar to the edge signal illustrated in FIG. 1. A sense unit 50 also receives the output signals from the optical encoder 38 and determines the direction of motor travel based on the phase differences between the multi-channel signals. A position accumulator 52 stores a count value indicating the position of the motor 32. The position accumulator 52 is incremented for each edge detected by the edge detection unit 48 while the motor is moving in one direction and decremented for each edge detected while the motor is moved in the opposite direction. An edge timer 54 stores the time elapsed since the last edge (i.e., the edge timer 54 is reset every time an edge is received).

A velocity filter 56 periodically samples the values stored in the position accumulator 52 and edge timer 54 to calculate a velocity for the motor 32 for the sample interval. The velocity filter 56 operates in two modes, an edge mode and a fixed interval mode. In the edge mode, the velocity is updated based on the number of edges counted and the time elapsed between the occurrence of the counted edges. In the fixed interval mode, the velocity is updated based on the number of edges counted and a fixed sampling interval (i.e., the value in the edge timer 54 is ignored).

A motor control unit 57 uses the position and velocity feedback information to control the signals provided to the motor 32 in accordance with conventional motor control techniques. The operation of the motor control unit 57 is well known to those of ordinary skill in the art, so the details of such operation are not described in greater detail herein.

In determining which mode to employ in calculating the velocity, the velocity filter 56 employs a hysteresis band centered about zero edge counts per sample interval and an outer band at four edge counts per sampling interval. If the number of edges counted in a given sampling interval is above four, the velocity filter 56 operates in the edge mode. While the motor 32 is slowing, the velocity filter 56 changes to the fixed mode responsive to zero edges being detected during the sample interval. The velocity filter 56 exits the fixed mode and re-enters the edge mode after four edges are counted during a sample interval. In general, the outer hysteresis band may be adjusted depending on the particular implementation, and the application of the present invention is not limited to any particular hysteresis band. Moreover, the invention may be implemented without a hysteresis band, where mode switching occurs at a single threshold.

The velocity filter 56 employs a finite response (FIR) filter, such as a moving average filter, that uses $2^n$ data points for determining a velocity value. The value of n may be configured in the firmware to provide differing filter responses. In the illustrated embodiment, the velocity filter 56 employs the filtering function regardless of the sampling mode (i.e., edge or fixed). However, the application of the invention is not so limited, and the filtering function may be selectively enabled or disabled depending on the mode. For example, the filtering may be performed for the fixed mode and not the edge mode.

When operating in the edge mode, the velocity filter 56 multiplies the number of edges counted during the sampling interval, d_edge, by an edge scaling factor, edge_scale, and divides by the time interval, d_time:

Velocity=$d$_edge*(edge_scale/$d$_time).

The edge scaling factor is based on the associated amount of motor travel for each edge detected and the time interval, d_time varies depending on the value selected for n.

When operating in the fixed mode, the velocity filter 56 multiplies the number of edges counted during the current sampling interval, d_edge, by a dxdt scaling factor:

Velocity=$d$_edge*$dxdt$_scale.

Because the sampling interval is known and fixed, it is incorporated into the dxdt_scale factor and the d_time value is ignored.

The variable, d_time, represents the edge-to-edge interval 16 shown in FIG. 1, measured over the selected $2^n$ moving average interval. Every sample interval, the velocity filter 56 is updated with two new values, pulse_count, and a time variable, clk_edge, generated by subtracting the value stored in the edge timer 54, edge_time, from a system clock to generate the clock time that would have been seen at the time of the last encoder edge.

The value of d_edge is the difference between the latest moving average pulse_count array element and a previously stored element, measured over the selected $2^n$ average interval. Similarly, d_time is the difference between the latest clk_edge array element and a previously stored element, measured over the same time interval. The value of d_edge therefore represents the number of new encoder edges or the change in the pulse_count value that occurred over the selected average interval. Similarly, d_time is the change in time, measured from the first to last encoder edge, for the same d_edge and average interval.

Figure 2:
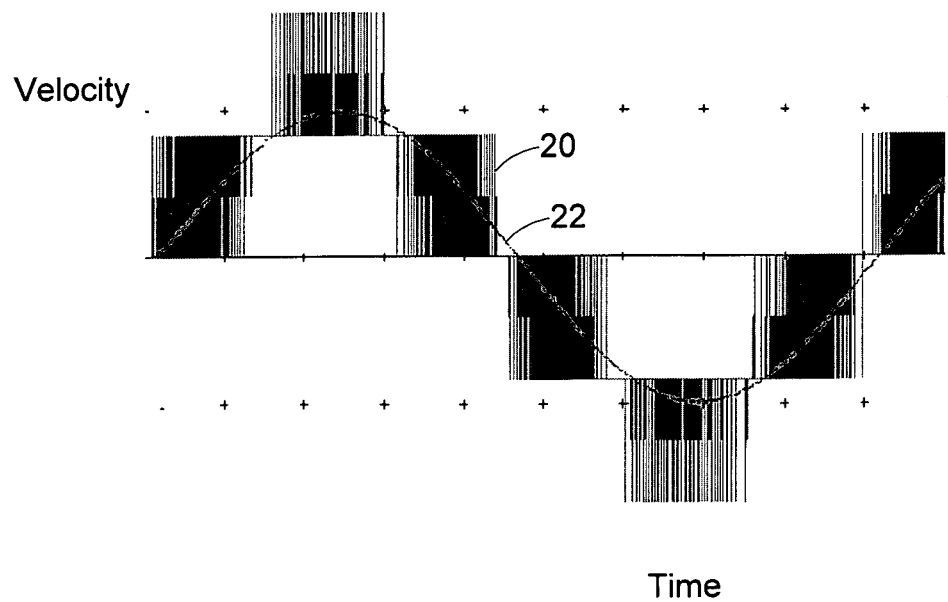
FIG. 2 is a diagram illustrating a motor velocity feedback signal generated using a fixed sampling period.

Turning now to FIGS. 5–8, diagrams illustrating the performance of the velocity filter 56 with differing values for n are shown. FIGS. 5–8 illustrate motor velocity curves generated using a simulation similar to that of FIG. 2. For purposes of illustration, the motor velocity is kept below the hysteresis setpoint of the velocity filter 56 (e.g., four edges per sampling interval). The motor velocity is varied sinusoidally between +35 rpm and −35 rpm at a frequency of 1 second. The sample interval for the velocity filter 56 is 500 usec. FIGS. 5–8 show plots of a velocity feedback signal 58 from the fixed mode velocity calculation algorithm and a baseline signal 60 generated from the feedback signal 58 to represent the actual velocity of the motor 32. The operation of the velocity filter 56 in the fixed mode is selected for illustration because it more clearly shows the advantage offered by the velocity filter 56 of the present invention. Jitter in the velocity feedback signal is more apparent in the fixed mode as compared to the edge mode.

Figure 5:
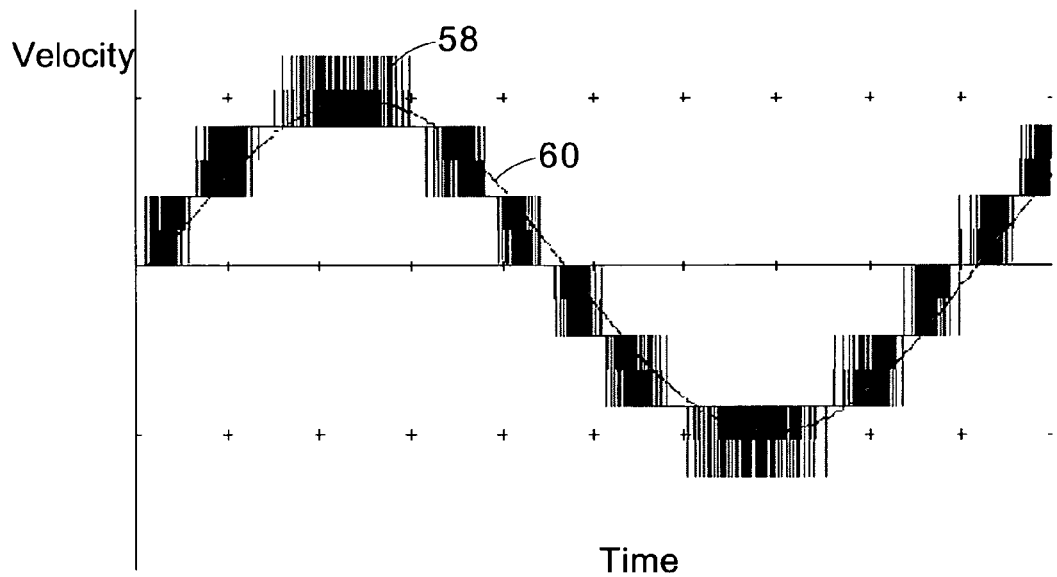
FIGS. 5–8 are diagrams illustrating a motor velocity feedback signal generated in accordance with the present invention using various filter settings.
Figure 6:
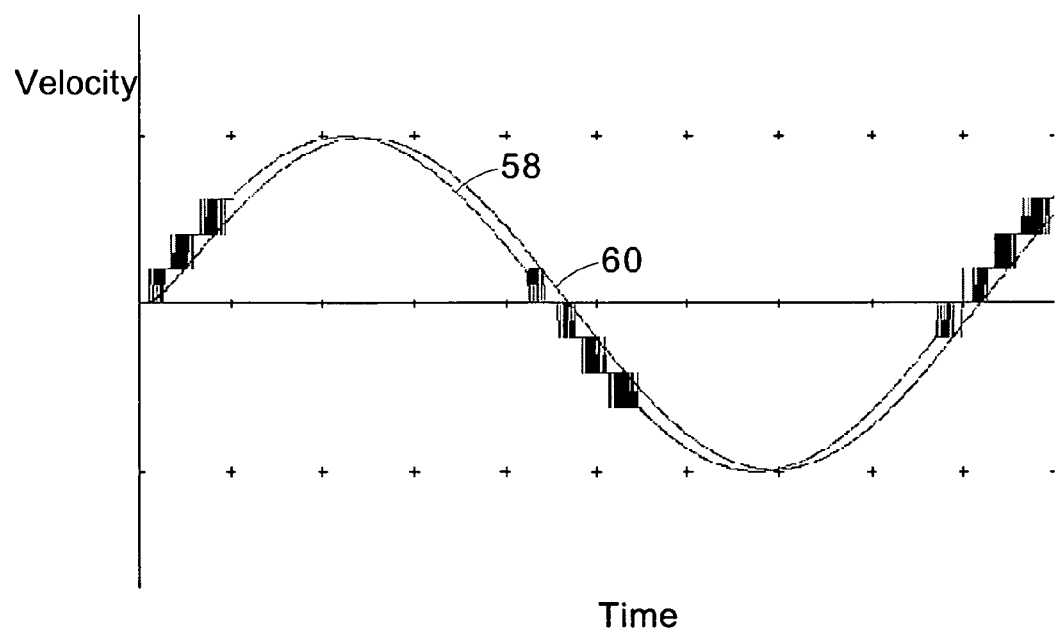
Figure 7:
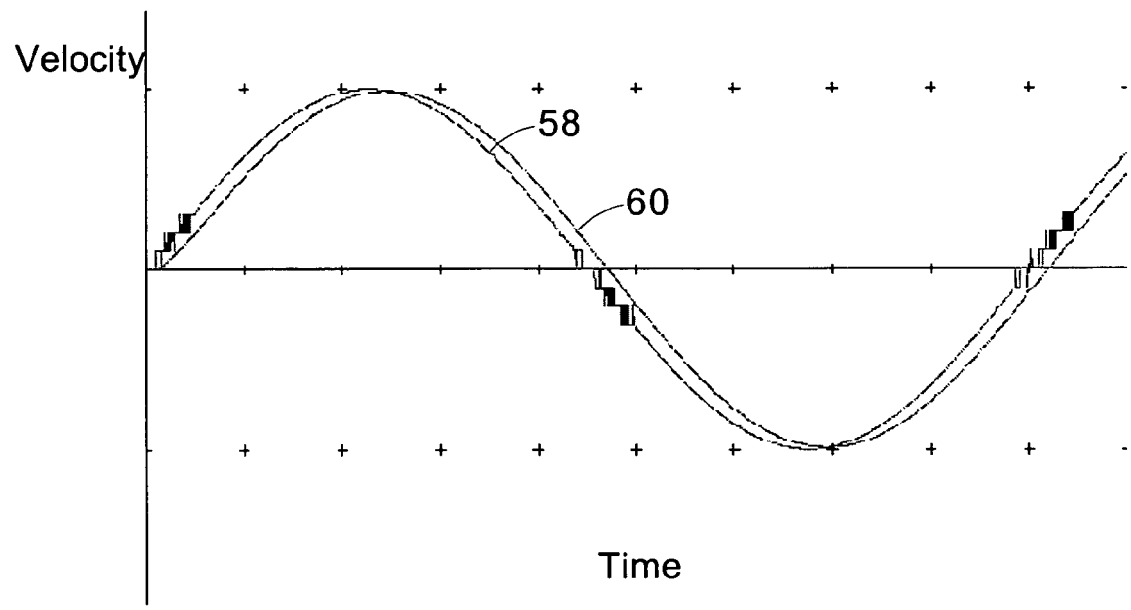
Figure 8:
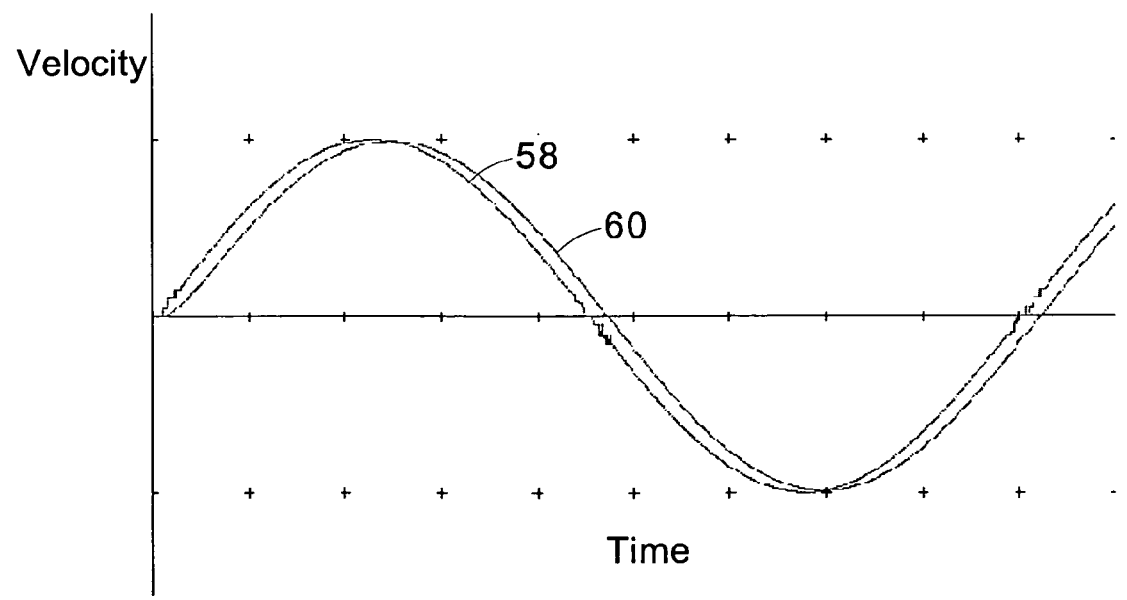

In FIG. 5, n=1, so 2 samples are used by the velocity filter 56. In FIGS. 6, 7, and 8, the value of n increases to 2 (4 samples), 3 (8 samples), and 4 (16 samples), respectively. Note that as the value of n increases, the velocity feedback signal 58 exhibits less pronounced band regions. The output of the velocity filter 56 more closely matches the actual velocity. Again, the phase difference between the measured velocity and the actual velocity in the Figures results from the simulation used to generate the exemplary curves, not the velocity filter 56.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for determining motor velocity, comprising:
   generating an edge signal including a plurality of edges, the edge signal indicating rotational travel of a motor;
   determining edge counts in the edge signal occurring during periodic sample intervals;
   filtering the edge counts over a predetermined number of samples;
   generating a velocity feedback signal for the motor based on the filtered edge counts; and
   wherein generating the velocity feedback signal further comprises generating the velocity feedback signal by selectively using one of an edge mode calculation and a fixed mode calculation.

2. The method of claim 1, wherein filtering the edge counts further comprises filtering the edge counts using a finite impulse response filter.

3. The method of claim 2, wherein the finite impulse response filter comprises a moving average filter.

4. The method of claim 1, wherein generating the velocity feedback signal further comprises scaling the filtered edge counts.

5. The method of claim 1, further comprising generating the velocity feedback signal based on the edge counts and a scaling factor based on a fixed sample interval.

6. The method of claim 1, further comprising:
storing an edge time value corresponding to the time elapsed since a most recent edge has occurred;
determining a time interval factor based on the periodic sample intervals and the edge time value; and
generating the velocity feedback signal based on the edge counts and the time interval factor.

7. The method of claim 6, wherein generating the velocity feedback signal further comprises scaling the filtered edge counts based on a scaling factor and the time interval factor.

8. The method of claim 1, further comprising selecting the fixed mode calculation responsive to determining that the edge count occurring during a particular sample interval is to a first predetermined threshold.

9. The method of claim 8, wherein the first predetermined threshold is zero counts.

10. The method of claim 8, further comprising selecting the edge mode calculation responsive to determining that the edge count occurring during a particular sample interval is greater than or equal to a second predetermined threshold.

11. The method of claim 10, wherein the second predetermined threshold is greater than the first predetermined threshold.

12. The method of claim 10, wherein the second predetermined threshold is about 4-three counts.

13. A drive unit for controlling a motor comprising:
an edge detection unit configured to receive a motor position signal and generate an edge signal including a plurality of edges to indicate rotational travel of the motor;
a position accumulator configured to determine edge counts in the edge signal occurring during periodic sample intervals;
a velocity filter having a predetermined sample interval that is configured to filter the edge counts and generate a velocity feedback signal for the motor based on the filtered edge counts; and
wherein the velocity filter is adjustable to select a number of predetermined sample intervals over which to generate a velocity feedback signal.

14. The drive unit of claim 13 wherein the velocity filter includes a finite impulse response filter.

15. The drive unit of claim 13 wherein the adjustable number of predetermined sample intervals is user selectable.

16. The drive unit of claim 13 wherein the velocity filter is further configured to scale the filtered edge counts.

17. The drive unit of claim 13 wherein the velocity filter is configured to generate the velocity feedback signal by selectively using one of an edge mode of operation and a fixed mode of operation.

18. The drive unit of claim 17 wherein the velocity filter is further configured to receive the edge counts from the position accumulator and select the fixed mode of operation when the edge count occurring during a particular sample interval reaches a predetermined threshold.

19. The drive unit of claim 18 wherein the predetermined threshold is zero counts.

20. The drive unit of claim 18 wherein the velocity filter is further configured to select an edge mode of operation when the edge count occurring during a particular sample interval reaches another predetermined threshold.

21. The drive unit of claim 20 wherein the another predetermined threshold is greater than the predetermined threshold and wherein the another predetermined threshold includes at least three edge counts.

22. The drive unit of claim 20 wherein the velocity filter is selectively enabled based on a mode of operation.

23. The drive unit of claim 22 wherein the velocity filter includes a hysteresis band centered about a predetermined number of edge counts per sample interval to control switching between a fixed mode of operation and an edge mode of operation.

24. The drive unit of claim 23 wherein the velocity filter is enabled during the fixed mode of operation and disabled during the edge mode of operation.

25. A motor control system comprising:
a motor;
an encoder coupled to the motor and configured to generate a motor position signal; and
a motor drive, comprising:
an edge detection unit configured to receive the motor position signal and generate an edge signal including a plurality of edges that indicates rotational travel of the motor;
a position accumulator configured to determine edge counts in the edge signal occurring during periodic sample intervals; and
a velocity filter configured to filter the edge counts to generate a velocity feedback signal for the motor based on a number of filtered edge counts over one of a first time period defined by a time elapsed between counted edges and a second time period defined by a fixed sampling interval.

26. The motor control system of claim 25 wherein the velocity filter is further configured to select between the first time period and the second time period based on a number of edge counts determined by the position accumulator during a particular sample interval.

27. An apparatus for determining motor velocity comprising:
means for generating an edge signal including a plurality of edges to indicate rotational travel of a motor;
means for determining edge counts in the edge signal occurring during periodic sample intervals;
means for filtering the edge counts over a number of samples;
means for selecting between a first time interval defined by a time elapsed between counted edges and a second time interval defined by a fixed sampling interval; and
means for generating a velocity feedback signal for the motor based on a number of filtered edge counts occurring over the selected one of the first time interval and the second time interval.

* * * * *